United States Patent [19]

Stowe, III

[11] Patent Number: 5,056,597
[45] Date of Patent: Oct. 15, 1991

[54] METHOD FOR IMPROVING THE STEAM SPLITS IN A MULTIPLE STEAM INJECTION PROCESS USING MULTIPLE STEAM HEADERS

[75] Inventor: George R. Stowe, III, Bakersfield, Calif.

[73] Assignee: Chevron Research and Technology Company, San Francisco, Calif.

[21] Appl. No.: 624,781

[22] Filed: Dec. 7, 1990

Related U.S. Application Data

[63] Continuation-in-part of Ser. No. 533,249, Jun. 4, 1990, Pat. No. 5,000,263, which is a continuation-in-part of Ser. No. 386,525, Jul. 27, 1989, Pat. No. 4,953,635.

[51] Int. Cl.⁵ .................... E21B 36/00; E21B 43/24
[52] U.S. Cl. ................... 166/303; 137/561 A; 166/57; 166/75.1
[58] Field of Search ............. 166/52, 57, 75.1, 91, 166/272, 302, 303; 122/401; 137/561 A

[56] References Cited

U.S. PATENT DOCUMENTS

| | | | |
|---|---|---|---|
| 3,386,508 | 6/1968 | Bielstein et al. | 166/303 X |
| 3,396,063 | 8/1983 | Godbey | 166/303 X |
| 4,488,598 | 12/1984 | Duerksen | 166/272 X |
| 4,505,297 | 3/1985 | Leech, III et al. | 137/561 A |
| 4,556,107 | 12/1985 | Duerksen et al. | 166/272 |
| 4,607,700 | 8/1986 | Duerksen et al. | 166/303 |
| 4,662,391 | 5/1987 | Tolley | 166/303 X |
| 4,800,921 | 1/1989 | Greebe | 166/303 X |

Primary Examiner—George A. Suchfield
Attorney, Agent, or Firm—Edward J. Keeling; Ernest A. Schaal

[57] ABSTRACT

A method is disclosed for enhancing the uniformity of steam distribution in a multiple steam injection system having a steam generator, a primary steam header, at least one secondary steam header, a primary steam line connecting the generator to the primary header, at least one secondary steam line connecting the primary header to the secondary steam header, and a plurality of tertiary steam lines connecting the secondary steam header to a plurality of steam injection wells. The enhanced uniformity of steam distribution results in better heat distribution between the wells. In that method, a surfactant is injected into the primary steam line and the secondary steam line, and the surfactant and steam are mixed sufficiently so that the surfactant and the steam enter each header as a foam. The concentration of the surfactant in the foam is from 10 ppm. to 5 wt %. Preferably, the surfactant is injected within seventy-five feet of the steam header. More preferably, the surfactant is injected into the primary steam line within fifty feet of the steam header. Still more preferably, the surfactant is injected into the primary steam line within twenty-five feet of the steam header.

9 Claims, 2 Drawing Sheets

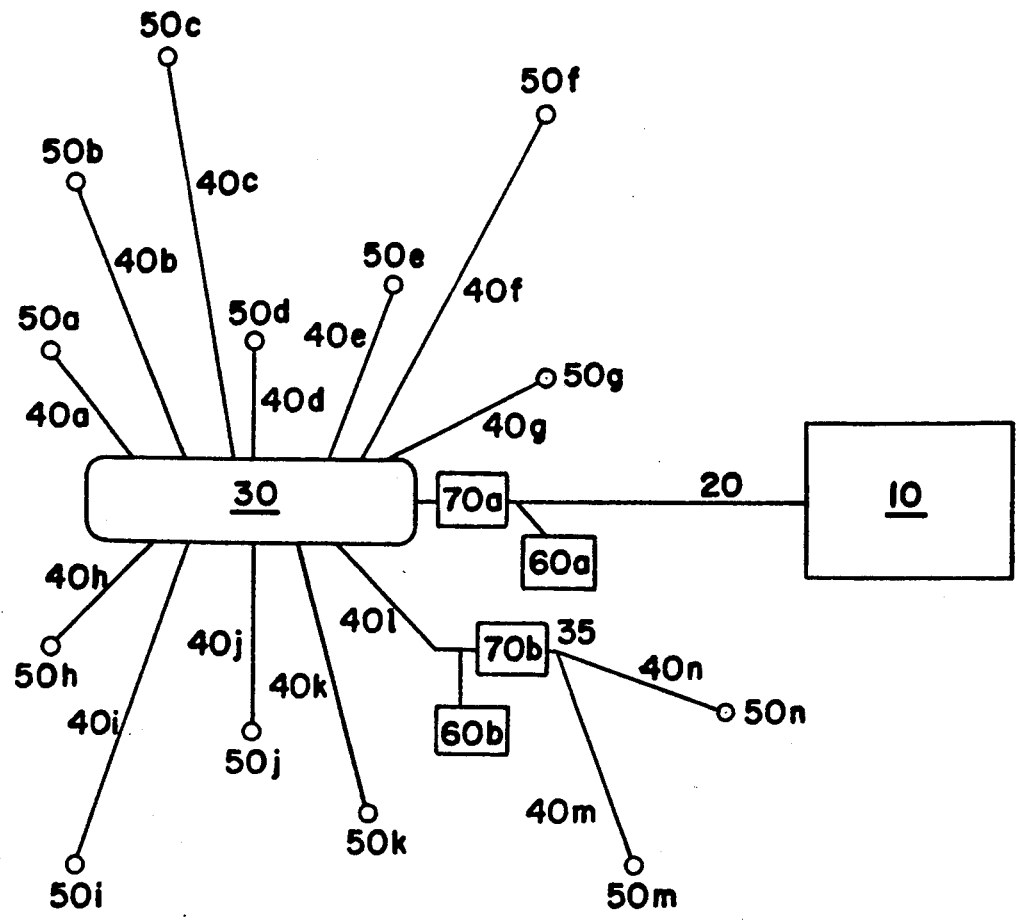
FIG_1

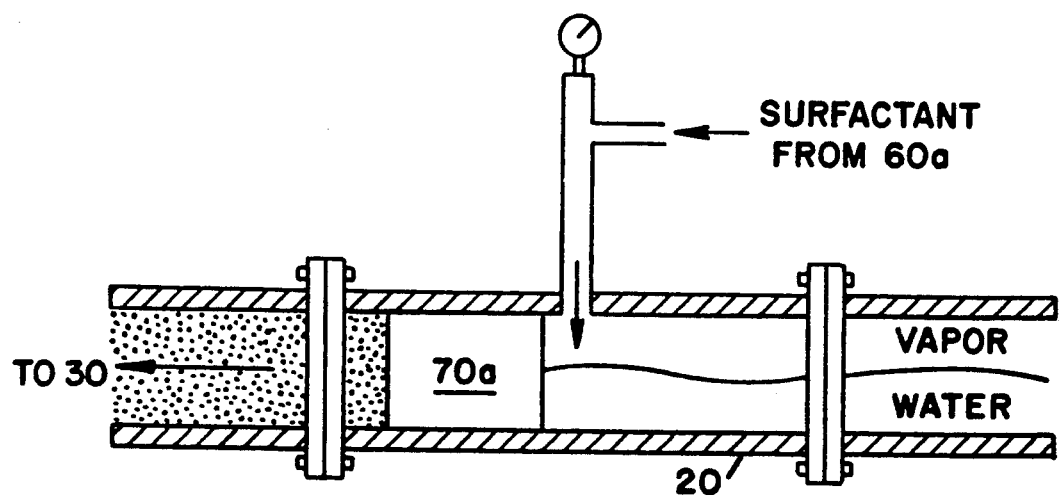
FIG_2

METHOD FOR IMPROVING THE STEAM SPLITS IN A MULTIPLE STEAM INJECTION PROCESS USING MULTIPLE STEAM HEADERS

CROSS-REFERENCE TO RELATED APPLICATIONS

This is a continuation-in-part of application Ser. No. 533,249, filed Jun. 4, 1990, now U.S. Pat. No. 5,000,263 which is a continuation-in-part of application Ser. No. 386,525, filed Jul. 27, 1989, now U.S. Pat. No. 4,953,635.

The present invention relates to thermally enhanced oil recovery. More specifically, this invention provides a method and apparatus for improving the uniformity of steam distribution during multiple well injection from common headers, thereby improving the heat distribution between wells.

BACKGROUND OF THE INVENTION

In the production of crude oil, that crude oil is often sufficiently viscous to require the injection of steam into the petroleum reservoir. Ideally, the petroleum reservoir would be completely homogeneous and the steam would enter all portions of the reservoir evenly. But, often this does not occur. Instead, steam selectively enters a small portion of the reservoir while effectively bypassing other portions of the reservoir. Eventually, "steam breakthrough" occurs and most of the steam flows directly from an injection well to a production well, bypassing a large part of the petroleum reservoir.

It is possible to overcome this problem with various remedial measures, e.g., by plugging off certain portions of the injection well. For example, see U.S. Pat. Nos. 4,470,462 and 4,501,329, which are hereby incorporated by reference for all purposes. But, to use these measures, one needs to find which portions of the reservoir are selectively receiving the injected steam. This is often a difficult problem.

Various methods have been proposed for determining how injected steam is being distributed in the wellbore. Bookout ("Injection Profiles During Steam Injection," SPE Paper No. 801-43C, May 3, 1967) summarizes some known methods for determining steam injection profiles and is incorporated by reference for all purposes.

The first and most widely used of these methods is the "spinner survey." A tool containing a freely rotating impeller is placed in the wellbore. As steam passes the impeller, it rotates at a rate that depends on the velocity of the steam. The rotation of the impeller is translated into an electrical signal, which is transmitted up the logging cable to the surface, where it is recorded on a strip chart or other recording device.

These spinners are greatly affected by the quality of the steam injected into the well, leading to unreliable results or results that cannot be interpreted in any way.

SUMMARY OF THE INVENTION

The present invention is a method for enhancing the uniformity of steam distribution in a multiple steam injection system comprising a steam generator, a primary steam header, at least one secondary steam header, a primary steam line connecting the generator to the primary header, at least one secondary steam line connecting the primary header to the secondary steam header, and a plurality of tertiary steam lines connecting the secondary steam header to a plurality of steam injection wells. The present invention is based upon the surprising discovery that one can get remarkably high uniformity of steam distribution during multiple well injection from a common header by injecting and mixing a surfactant into the steam immediately before the steam enters the primary header, injecting additional surfactant into the secondary steam line, then remixing the surfactant and steam immediately before the steam enters the secondary headers. The enhanced uniformity of steam distribution that results from this invention causes better heat distribution between the wells.

For instance, instead of getting the very poor quality splits to individual wells of 30% to 70% steam quality, one can reduce the spread to a range of 64% to 69%. The present invention comprises injecting a surfactant into the primary steam line and the secondary steam line, and mixing the surfactant and steam sufficiently so that the surfactant and the steam enter each header as a foam. The concentration of the surfactant in the foam should be from 10 ppm. to 5% by weight. The injection point of surfactant into the primary steam line should be within seventy-five feet of the primary steam header, preferably within fifty feet, more preferably within twenty-five. The injection point of surfactant into the secondary steam line should be within seventy-five feet of the secondary steam header, preferably within fifty feet, more preferably within twenty-five.

Preferably, the surfactant and steam are mixed in the primary steam line using a static mixer, and the surfactant and steam are mixed in the secondary steam line using an orifice plate.

BRIEF DESCRIPTION OF THE DRAWINGS

In order to assist the understanding of this invention, reference will now be made to the appended drawings. The drawings are exemplary only, and should not be construed as limiting the invention.

FIG. 1 is a schematic drawing of a multiple well steam injection system of the present invention. That drawing is not drawn to scale.

FIG. 2 is a schematic drawing of how surfactant can be injected into the multiple well steam injection system.

DETAILED DESCRIPTION OF THE PREFERRED EMBODIMENTS

In its broadest aspect, the present invention is a method of achieving remarkably high uniformity of steam distribution during multiple well injection from common headers. This is achieved by injecting and mixing a surfactant into the steam immediately before the steam enters the primary header, injecting additional surfactant into the secondary steam line, and remixing the surfactant and steam before the steam enters any secondary header.

The present invention is used in a multiple steam injection system comprising a steam generator, a primary steam header, at least one secondary steam header, a primary steam line connecting the generator to the primary header, at least one secondary steam line connecting the primary header to the secondary steam header, and a plurality of tertiary steam lines connecting the secondary steam header to a plurality of steam injection wells.

By "steam generator," we mean an apparatus in which steam is formed. By "steam header," we mean a manifold for distributing steam to a plurality of steam lines. By "primary steam line," we mean a steam line connecting a steam generator to a primary steam header. By "secondary steam line," we mean a steam line connecting a steam header to either a steam injection well or a secondary steam header. By "tertiary steam line," we mean a steam connection a secondary steam header to a steam injection well.

The invention method comprises injecting a surfactant into the primary steam line, mixing the surfactant and steam sufficiently so that the surfactant and the steam enter the primary header as a foam, and remixing the surfactant and steam sufficiently so that the surfactant and the steam enter any secondary header as a foam.

By "surfactant," we mean a surface-active substance that can foam with steam. Examples of surfactants include alkyl aromatic sulfonates, alpha olefin sulfonates and derivatives including dimers, alkyl diphenylether disulfonates or sulfonates, alkyl naphthalene sulfonates, and alcohol ethoxysulfates. Examples of particular surfactants that would work are Chaser CS1010, Chaser SD1000, and Chaser SD1020, which are trademarked products of Chevron Chemical Company and which have high active concentrations (50% active) and the ability to foam at steam injection conditions.

The preferred concentration of the surfactant in the foam is from 10 ppm. to 5 wt % for economic reasons, since low concentrations would still be sufficient to generate sufficient foam. More preferably, the concentration is between 100 ppm and 0.2 wt %.

For best results the surfactant should be injected into the primary steam line within seventy-five feet of the primary steam header. As a rule, the closer the injection point is to the primary steam header the better because the foam will return to a two phase condition if the injection point is too far from the header. Preferably, the surfactant is injected into the primary steam line within fifty feet of the steam header. More preferably, the surfactant is injected into the primary steam line within twenty-five feet of the steam header. Likewise, additional surfactant should be into the secondary steam line, and the surfactant and steam should be remixed as close as possible to any secondary steam header.

Referring to FIGS. 1 and 2, steam is generated in steam generator 10 and is passed through primary steam line 20 to primary steam header 30 where it is split and sent through secondary steam lines 40a through 40l to steam injection wells 50a through 50k and wells 50m and 50n. Surfactant, which is stored in vessel 60a is injected into the primary steam line 20 and is mixed sufficiently with the steam in static mixer 70a to form a foam immediately before entering primary steam header 30. Because of this foam, the distribution of the steam from the steam header is remarkably uniform through lines 40a through 40l. Additional surfactant, which is stored in vessel 60b, is injected into the secondary steam line 40l and is mixed sufficiently with the steam in orifice plate 70b to form a foam immediately before entering the secondary steam header 35. Because of this second foam, the distribution of the steam from the secondary steam header 35 is remarkably uniform through tertiary lines 40m through 40n.

While static mixers are preferred for mixing the surfactant and steam in the primary steam line, preferably orifice plates are used to mix the surfactant and steam in the secondary steam lines. If static mixers are used in the secondary steam lines, the back pressure created by static mixers would be too great. By using orifice plates after the initial split, the necessary turbulence could be obtained without an increase in back pressure to the system.

While the present invention has been described with reference to specific embodiments, this application is intended to cover those various changes and substitutions that may be made by those skilled in the art without departing from the spirit and scope of the appended claims.

What is claimed is:

1. A method for enhancing the uniformity of steam distribution in a multiple steam injection system comprising a steam generator, a primary steam header, at least one secondary steam header, a primary steam line connecting the generator to the primary header, at least one secondary steam line connecting the primary header to the secondary steam header, and a plurality of tertiary steam lines connecting the secondary steam header to a plurality of steam injection wells, the method comprising:
   (a) injecting at least one surfactant into the primary steam line,
   (b) mixing the surfactant and steam in the primary steam line sufficiently so that the surfactant and the steam enter the primary steam header as a foam,
   (c) injecting additional surfactant into the at least one secondary steam line connecting the primary header to the secondary steam header, and
   (d) mixing the surfactant and steam present in the secondary steam lines sufficiently so that the surfactant and the steam enter the secondary steam header as a foam.

2. A method according to claim 1 wherein the surfactant and steam are mixed in the primary steam line using a static mixer.

3. A method according to claim 1 wherein the surfactant and steam are mixed in the secondary steam line using an orifice plate.

4. A method according to claim 1 wherein the surfactant is injected into the primary steam line within seventy-five feet of the primary steam header.

5. A method according to claim 4 wherein the surfactant is injected into the primary steam line within fifty feet of the primary steam header.

6. A method according to claim 5 wherein the surfactant is injected into the primary steam line within twenty-five feet of the primary steam header.

7. A method according to claim 1 wherein the additional surfactant is injected into the secondary steam line within seventy-five feet of the secondary steam header.

8. A method according to claim 7 wherein the additional surfactant is injected into the secondary steam line within fifty feet of the secondary steam header.

9. A method according to claim 8 wherein the additional surfactant is injected into the secondary steam line within twenty-five feet of the secondary steam header.

* * * * *